Feb. 26, 1929.                     H. J. THIELKER                          1,703,122
                              GUN PORT FOR WINDSHIELDS
                                 Filed Jan. 19, 1928
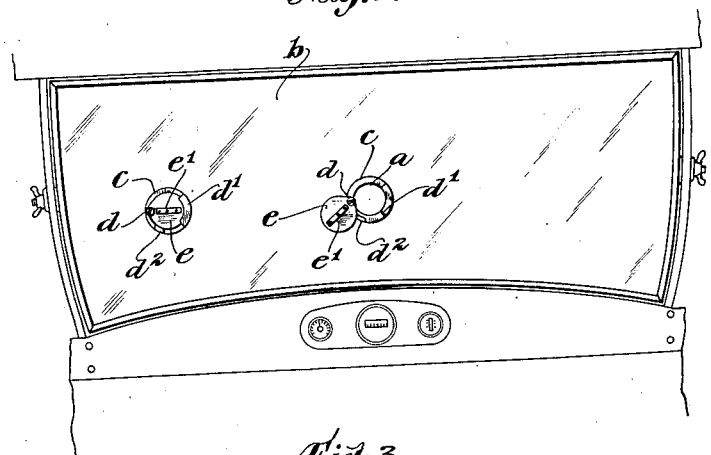
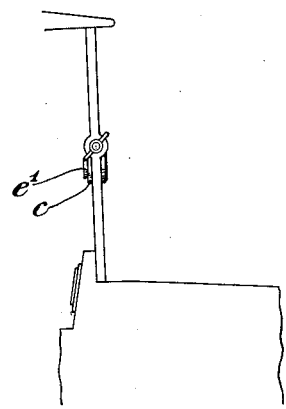
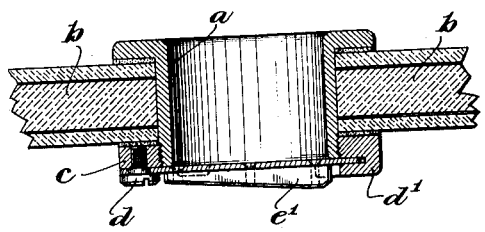
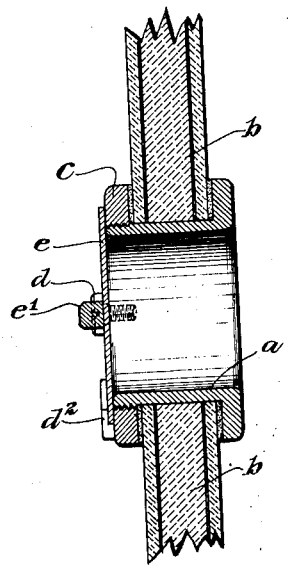
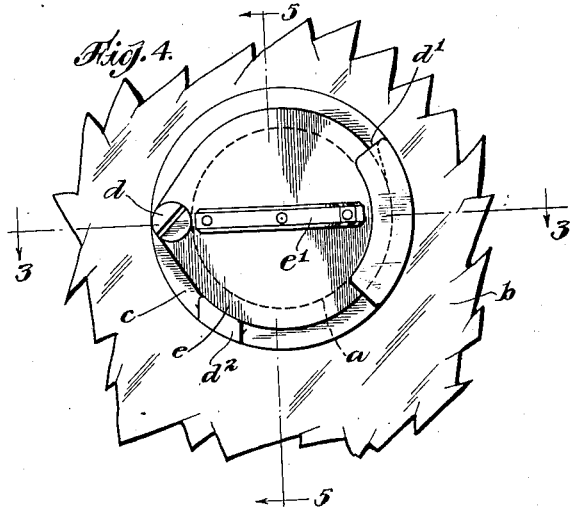
INVENTOR
Henry J. Thielker
BY
Redding, Greeley, O'Shea & Campbell
ATTORNEYS Patented Feb. 26, 1929.

1,703,122

UNITED STATES PATENT OFFICE.

HENRY J. THIELKER, OF NEW YORK, N. Y., ASSIGNOR TO TRIPLEX SAFETY GLASS COMPANY OF NORTH AMERICA, OF NEW YORK, N. Y., A CORPORATION OF DELAWARE.

GUN PORT FOR WINDSHIELDS.

Application filed January 19, 1928. Serial No. 247,775.

What is termed bullet-proof glass, that is, glass which cannot be penetrated by a bullet from a small arm, is now required for the windshields of motor driven armored cars. In some municipalities it is also required that such a windshield shall be provided with a port through which the muzzle of a gun may be directed from within the windshield toward the assailant. The object of the present invention is to provide for such a gun-port a shutter which, when in alignment with the port, shall be capable of preventing the entrance of a bullet from without and shall be capable of being swung readily to open position by a slight movement of the muzzle of the gun as it is brought to the port. Provision is made whereby the shutter is held securely in its closed position. The invention will be more fully explained hereinafter in reference to the accompanying drawing in which it is illustrated and in which:

Figure 1 is a view in elevation, as seen from the inside, of a motor car windshield, some of the supporting means being also indicated.

Figure 2 is a view of the same as seen from the right hand in Figure 1.

Figure 3 is a detail view in section on the plane indicated by the broken line 3—3 of Figure 4, and on a larger scale.

Figure 4 is a detail view in elevation and on a larger scale than Figure 1, showing the shutter in closed position.

Figure 5 is a detail view in vertical section on the plane indicated by the broken line 5—5 of Figure 4.

The windshield $b$ of bullet-proof glass of any suitable character, is provided at a convenient point or points with an aperture or apertures through which a gun may be directed from the inside of the windshield toward an assailant. In such aperture is fitted a sleeve $a$ flanged at its outer end to bear against the outside of the windshield and threaded at its inner end to receive a ring nut $c$, suitable packing being placed between the flange and nut and the glass at each side. Pivoted on the ring nut $c$ at one side, as at $d$ is a metal shutter $e$ of such material and thickness as to resist puncture by a bullet. Opposite the pivot $d$ the ring $c$ is provided with a lip $d^1$ spaced from the body of the ring so as to permit the shutter $e$ to pass behind the lip and be held thereby from displacement inward. The ring nut $c$ is also provided, as at $d^2$, with a stop to limit the closing movement of the shutter $e$ and prevent it from passing out of engagement, when closed, with the lip $d^1$. To the shutter, on its inner face, is secured as by rivets, a transverse rib $e^1$ which, as the gun is moved toward firing position, is struck by the muzzle of the gun in a slight upward movement so as to throw the shutter from its closed position, as shown in the metal portion of Figure 1.

It will be obvious not only that the port is effectually protected by the shutter when the shutter is in its closed position, but that the shutter is readily and quickly thrown to open position in the movement of the gun, thereby fulfilling the requirement of speed.

I claim as my invention:

The combination with a bullet-proof windshield having a gun-port formed therein, of a flanged sleeve passed through the gun-port from the outside and threaded at its inner end, a ring-nut threaded on the inner end of said sleeve, and a shutter pivoted on the ring-nut at one side thereof, the ring-nut being formed with a stop to limit the opening movement of the shutter and with a lip opposite the pivot to engage the edge of the shutter, the shutter having a transverse rib for engagement by a gun-muzzle in the opening of the shutter.

This specification signed this 17th day of January A. D. 1928.

HENRY J. THIELKER.